United States Patent [19]

Oda et al.

[11] Patent Number: 4,586,852

[45] Date of Patent: May 6, 1986

[54] APPARATUS FOR THE RECLAMATION OF SLURRY FROM THE BOTTOM OF A STORAGE SILO

[75] Inventors: Ronald L. Oda; Jeffrey L. Beck; Robert M. Blubaugh; Gary R. Harris, all of Ponca City, Okla.; Ricky L. Shaw, Bethel Park; Michael P. Evans, Pittsburgh, both of Pa.

[73] Assignee: Conoco Inc., Ponca City, Okla.

[21] Appl. No.: 627,161

[22] Filed: Jul. 2, 1984

[51] Int. Cl.[4] .................. B65G 53/30; B65G 53/66
[52] U.S. Cl. ........................ 406/14; 406/19; 406/103; 406/137; 406/152
[58] Field of Search ............ 406/14, 19, 30, 103, 406/109, 113, 115, 12, 142, 151, 152, 153, 137; 210/197

[56] References Cited

U.S. PATENT DOCUMENTS

| | | | |
|---|---|---|---|
| 3,329,267 | 7/1967 | Millhiser | 406/142 X |
| 3,400,984 | 9/1968 | Shellene et al. | 406/12 |
| 3,514,217 | 5/1970 | Reiss . | |
| 3,545,618 | 12/1970 | Gregg et al. | 210/167 |
| 3,565,491 | 2/1971 | Frazier | 406/12 |
| 3,617,094 | 11/1971 | Kester . | |
| 3,621,593 | 11/1971 | Hickey | 37/57 |
| 3,870,373 | 3/1975 | Doerr et al. . | |
| 3,942,841 | 3/1976 | McCain et al. . | |
| 3,966,261 | 6/1976 | Doerr et al. . | |
| 3,981,541 | 9/1976 | Doerr et al. . | |
| 3,993,359 | 11/1984 | Sweeney . | |
| 4,060,281 | 11/1977 | Doerr . | |
| 4,143,921 | 3/1979 | Sweeney . | |
| 4,265,572 | 5/1981 | Bourdois et al. | 406/137 X |
| 4,548,001 | 10/1985 | Link | 406/153 X |

FOREIGN PATENT DOCUMENTS 95263 8/1960 Netherlands ..................... 406/137

*Primary Examiner*—Joseph F. Peters, Jr.
*Assistant Examiner*—Patrick N. Burkhart
*Attorney, Agent, or Firm*—William J. Miller; Cortlan R. Schupbach

[57] ABSTRACT

An apparatus for controlling the density from a reclamation slurry tank or silo includes apparatus for adding slurry to the tank, an overflow from the tank which communicates with a sump, and reclamation apparatus mounted toward the bottom of the tank. The reclamation apparatus essentially comprises a bell mouthed pipe directed downwardly and exiting horizontally from the tank. The pipe is connected to a pump for removing slurry accumulating at the bottom of the tank. The pipe also includes apparatus for measuring the density and/or flow through the pipe. The density from the tank is controlled by a fluid inlet mounted between the bell mouth and the pump which forces fluid into the pipe in accordance with the measured flow or density as compared to a predetermined flow or density. To facilitate the operation, various fluidizing jets are included around the bell mouth and around the bottom of the tank.

12 Claims, 3 Drawing Figures

APPARATUS FOR THE RECLAMATION OF SLURRY FROM THE BOTTOM OF A STORAGE SILO

DISCUSSION OF THE PRIOR ART

The prior art known to applicants can be divided into three general categories; first, that art dealing with the measurement of density in a pipeline with subsequent control attempting to correct density errors; second, vertical storage silo apparatus used in a mine to assist in the processing of slurry from a mine; and third, sumps other than vertical sumps useful for handling slurry in a mine.

In the first category are the patents to K. R. Shellene et al, No. 3,400,984 and L. P. Reiss, No. 3,514,217. These patents both deal with methods and apparatus for controlling the density of slurry in a pipeline. The Shellene patent adds fluid or removes fluid in attempting to control density.

The second group of patents are issued to Richard E. Doerr et al, No. 3,966,261; David L. McCain et al, No. 3,942,841; William T. Sweeney, No. 3,993,359; and Harold O. Kester et al, No. 3,617,094. Each of the above patents discloses a vertical sump for the storage of slurry and the removal of the slurry being stored. The Sweeney patent discloses a jet type pump which removes slurry from a vertical tank and includes fluidizing jets to prevent clogging of the slurry in case it stands and becomes solidified. The patents to Doerr et al and McCain et al both disclose vertical storage tanks used for the storage of slurry in a mine. In these patents, however, the slurry is removed from the bottom of the tank either through the utilization of a pump or by gravity feed and subsequently removed by means of a pump. The patent to Kester discloses a portable slurry tank where the slurry is removed from the bottom by means of a pump sucking the material out of the tank.

Pat. Nos. 4,060,281; 3,981,541; 4,143,921; 3,870,373; and 3,545,618 all disclose various sumps useful in or out of a mine and the large reclamation sump which incorporates pumps either fixed or movable for removing slurry from the bottom of the sump.

BRIEF DESCRIPTION OF THE INVENTION

This invention is an improved apparatus for providing temporary storage of slurry during mining and other operations, for example, and then reclaiming the slurry at a constant density for efficient transportation through subsequent apparatus such as a pipeline. In the previous patents, slurry is generally controlled by moving the pump either vertically or horizontally in attempting to maintain a fairly constant density in the subsequent pipeline. Thus, if the density is decreased, the pump is trammed faster to pick up more material.

An apparatus similar to that disclosed in Pat. No. 4,143,921 was constructed in a mine, however, such an apparatus has distinct problems when the sump is placed underground. One distinct problem is the physical difficulty in excavating the mine floor and in supporting the mine roof so that a large horizontal sump can be fabricated underground. A second problem is the economical reliability of the apparatus used to remove the slurry, such apparatus requiring tracks above the sump for moving pumps and attendant housing and all of the other necessary features required to fill the sump in a uniform manner such as controlled hoppers which communicate the slurry from one location to another as the pump is reclaiming the slurry from the bottom of the sump.

The apparatus disclosed herein clearly simplifies the reclamation problems in a mine or in a mining operation either below or above ground. First, the addition of the slurry into the tank does not require any elaborate apparatus. Second, no moving apparatus such as pumps and the like are necessary to reclaim the slurry. Furthermore, a tank can be formed in the bottom of the mine floor as a vertical shaft thus greatly easing the complication of construction in the mine. Third, with no moving parts the mechanical difficulties are drastically reduced.

Basically, this invention comprises a vertical tank with apparatus at the top for introducing the slurry in a controlled manner. A bell mouth is placed near the bottom of the tank with the mouth directed toward the bottom of the tank. A pipe communicates with the bell mouth and exits the tank. A bell mouth, which is directed in a downwardly direction, will not plug when the tank is not used for an extended period of time and the slurry solidifies. To ease in the breakup of slurry, various fluidizing jets are incorporated around the bell mouth. First, fluidizing jets are directed downwardly toward the bottom. Second, fluidizing jets are incorporated at the bottom of the tank to move the slurry toward the bell mouth. Third, a fluidizing jet can be incorporated which is directed into the mouth for breaking any compacted particles which might occur at that location.

The density in the pipeline is measured by a densitometer attached to the pipeline after it exits the sump. A flow meter can be attached to the pipeline with the outputs from the flow meter and densitometer being applied to the input of a process controller. The density of the slurry being removed can be carefully controlled by adding fluid through a dilution port to the interconnecting pipe between the bell mouth and the pump used to remove the slurry from the tank. This fluid is added by a dilution water pump which has its input connected to a sump and its discharge connected to the dilution port.

In the preferred embodiment the dilution port is mounted at the 90° elbow which couples the bell mouth to the horizontal portion of the pipe leaving the slurry tank. The amount of fluid being added by the pump can be controlled by either varying the speed of rotation of the dilution water pump or by controlling a valve between the dilution water pump and the port where the fluid is added to the interconnecting pipe, either of which are controlled from the output from the process controller. An overflow is provided at the top of the tank for excess fluids. The overflow is directed to a sump.

DETAILED DESCRIPTION OF THE INVENTION

Figure 1:
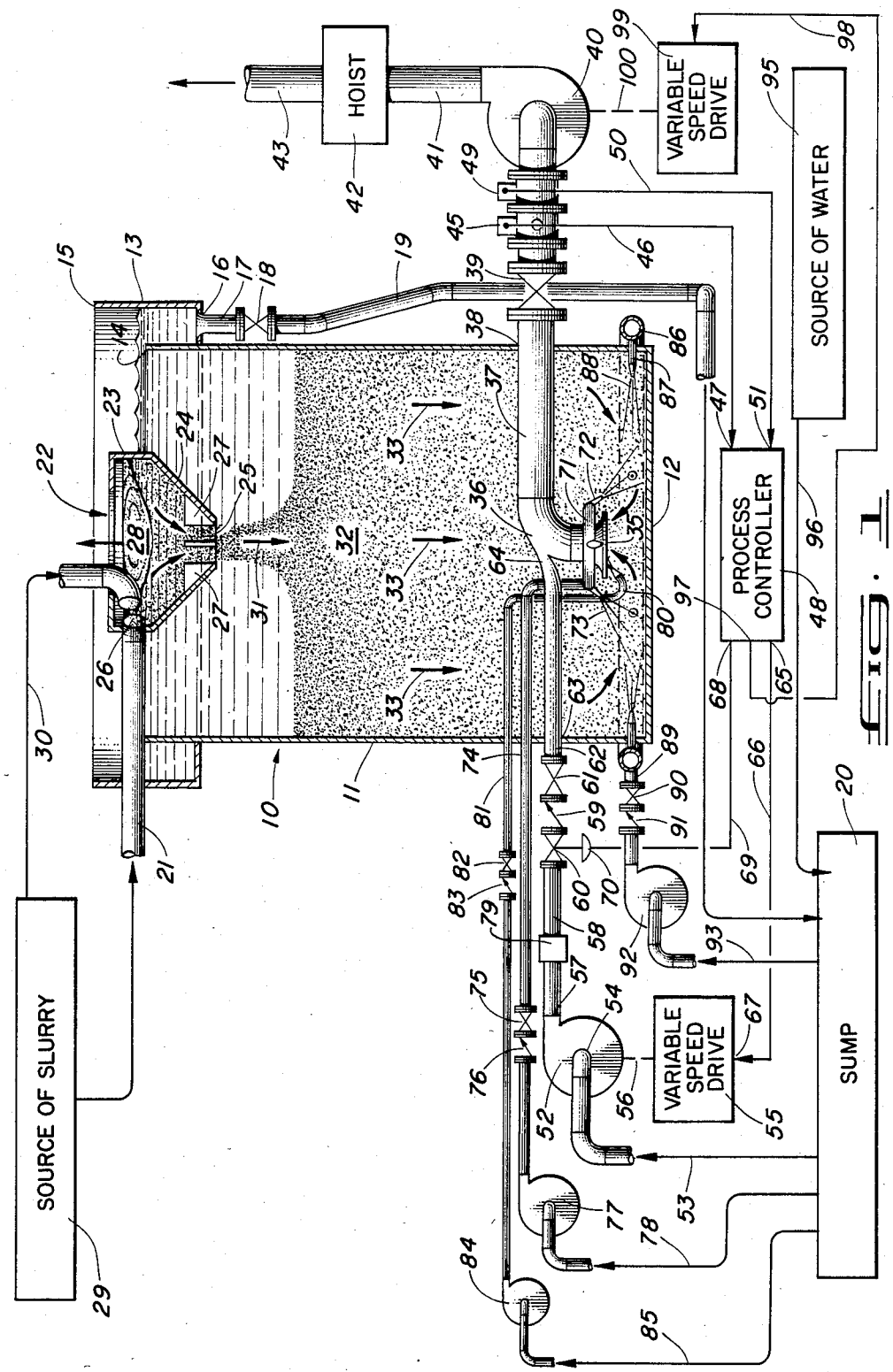
FIG. 1 illustrates the preferred embodiment of the invention showing a cross section of the tank with the pipe connection shown in full view.

Referring to FIG. 1 a slurry tank referred to by arrow 10 includes side walls 11 and a bottom 12. The side walls and bottom can be made of metal, cement or any other convenient material. The material actually used will depend upon where it is installed and the convenience of getting the particular material to the installation location. Overflow control means is provided by an enlarged portion of tank 13 surrounding the top 14 of tank 10 and having a top 15 higher than top 14 of tank 10. Portion 13 has a bottom 16 which encloses portion 13 to the escape of fluids. An overflow pipe 17 passes through a shutoff valve 18 and to subsequent pipe 19 which is coupled to a sump 20. Slurry is inputted from one mine face, for example, through pipe 21 to an inlet apparatus generally referred to by arrow 22. The inlet apparatus is anchored in any means such as bracing members (not shown) to tank side wall 11, enlarged portion 13, or mine roof (not illustrated). Inlet apparatus 22 basically functions to remove the turbulence in a high velocity line entering a tank and generally is constructed of a cylindrical portion 23 and a conical portion 24 with an outlet 25. The fluids entering inlet apparatus from pipe 21 will generally be directed by means of the outlet 26 from pipe 21 so that it swirls around inlet apparatus 22. This prevents the material from splashing over the inlet and eliminates other problems. In order to reduce the swirl and thus reduce the turbulence inside tank 10, a plurality of vanes 27 is affixed to conical portion 24 in a manner to slow or stop the rotation of slurry 28 inside inlet apparatus 22. Material can also be supplied from a source of slurry 29 through a second pipe 30 to inlet apparatus 22. Slurry 29 can be several mine faces; and, while two inlet pipes 21 and 30 are disclosed, it is obvious that many more can be incorporated.

Once slurry 28 is slowed by vanes 27, it drops in the direction of arrow 31 to a bed of slurry 32 which settles in the direction of arrows 33.

The inlet portion disclosed herein is the subject of a copending application and is specifically disclaimed herein as part of this invention.

The removal of the slurry is accomplished by apparatus comprising a bell mouth 35 which communicates with a 90° elbow 36 with a horizontal pipe 37 which passes out an opening 38 in side wall 11 through a shutoff valve 39 to slurry pump 40. The output of pump 40 is connected to a pipe 41 which may be coupled to a hoist apparatus 42 if tank 10 is at a depth more than the final destination of the slurry. Hoist 42 communicates with a pipe 43 to the final destination of the slurry such as a preparation plant if the slurry were coal and water. It is obvious that, if the tank 10 is located on the surface, a hoist apparatus would not be necessary. Under these conditions pump 40 would communicate directly to pipe 41 which would be connected to the end use apparatus of the slurry and not to a hoist.

In order to measure density of the slurry being communicated through pipe 37 to pump 40, density measuring apparatus 45 is attached in series with pipe 37 and has an output coupled through wire 46 to input 47 of process controller 48. A flow meter 49 is coupled through a wire 50 to an input 51 of process controller 48.

A pump 52 will pump fluids from sump 20 up pipe 53 to the inlet 54 of pump 52. A variable speed drive 55 is coupled mechanically through linkage 56 to the drive shaft (not shown) of pump 52. The outlet 57 of pump 52 is coupled through a pipe 58 to a control valve 60, check valve 59, and a shutoff valve 61 to pipe 62. The fluids then pass through an opening 63 to a port 64 mounted in elbow 36.

Variable speed drive 55 is controlled by process controller 48 by an output signal generated at output 65 which is coupled through a wire 66 to the input 67 of variable speed drive 55. Control valve 60 can, likewise, be controlled by the process controller through its output 68 which is coupled through a wire 69 to the control portion 70 of valve 60.

In order to maintain a constant density in pipe 37, it is desirable that the slurry be maintained in a fluidized state near bell mouth 35 in tank 10. It is also desirable to maintain a fluidized state in the entire bottom of tank 10 when it is being cleaned out, especially if it has a flat bottom 12 as shown. To accomplish the fluidization several fluidizing jets are incorporated. The first series comprises a manifold 71 having a plurality of jets 72 mounted around it directed in a downwardly direction as illustrated by lines 73. Manifold 71 is coupled through a pipe 74 through a shutoff valve 75 and a check valve 76 to a pump 77. Pump 77 gets its fluid from sump 20 through a pipe 78. For better control of the density through pipe 37, an additional flow meter 79 may be mounted in pipe 58. This flow meter would be coupled to process controller 48 to control the variable speed drive 55 thus changing the flow rate. Densitometer 45 would then be used in conjunction with a control loop in process controller 48 to generate an internal set point for the control loop in process controller 48 which receives the signal from flow meter 79 as its feedback and generates an output 65. This is a cascaded control loop as generally practiced in the industry. An additional jet 80 is mounted so that it will direct its jet into the bell mouth 35 to break up any solidified particles of slurry and to assist in the movement of slurry into the bell mouth. Jet 80 is coupled through a pipe 81 through a cutoff valve 82 and a check valve 83 to a pump 84. Pump 84 gets its fluid from sump 20 coupled through a pipe 85. A third series of fluidizing jets for assisting in cleaning out tank 10 is coupled around the outside of tank 10 by means of a circular pipe or manifold 86 which has a plurality of jets 87 passing through the side wall of tank 10 and directed along the bottom as illustrated by lines 88. Circular pipe 86 is, likewise, coupled through a pipe 89 through a cutoff valve 90 and a check valve 91 to pump 92. Pump 92 gets its fluid from sump 20 coupled through a pipe 93. A source of water 95 is coupled through a pipe 96 to sump 20. A third output 97 from process controller 48 is coupled through a wire 98 to a variable speed drive 99. Drive 99 is mechanically coupled through linkage 100 to the shaft of pump 40.

It is obvious that additional flow meters can be incorporated into the system for closer control of the overall density in tank 10. For example, flow meter (not shown) can be added to each of the fluidizing jet pipes 81, 74 and 89. Information from any or all of these flow meters can be inputted into process controller 48 for closer control of the dilution fluid from pipe 57 into port 64. The output from each of the flow meters can also be used as an indicator of flow or proper operation for the information of the operator.

OPERATION

The reclamation apparatus operates as follows:

Tank 10 is dimensioned to hold the required slurry necessary for the operation contemplated, that is, the tank must be sized to maintain a steady outward, uniformly dense slurry with varying amounts of slurry at the input. A source of slurry 29 can be a mine face underground or a surface mine and can be any material such as phosphate, coal, iron ore or any other product. This description will be limited to that used in coal; however, the apparatus is not limited to the use of coal.

When the material is formed at slurry source 29, it is communicated through pipes 21 or 30 to the inlet apparatus 22. Generally the inlets 26 will be formed to cause the material to swirl around the inside of inlet apparatus 22. The turbulence at the inlet is reduced by the vanes 27 which slow the rotation and permit the material to drop out the bottom of conical portion 24 through outlet 25 and to the inside of tank 10. Once sufficient slurry accumulates on the inside of tank 10, pump 40 and pump 52 are started along with pump 77 which draws water from sump 20 and to the manifold 71 surrounding the outside of bell mouth 35. Fluid then flows through jets 72 which begins to agitate the slurry near bell mouth 35. Additional fluidizing jets 87 and 80 can be turned on by operating pumps 92 and 84, respectively, which draw their fluid from sump 20 through pipes 93 and 85, respectively, and pass the fluid down pipes 89 and 81, respectively, to the jets. With or without the slurry fluidized around the bell mouth 35, pump 40 can draw the slurry into bell mouth 35 around elbow 36 through pipe 37 and past densitometer 45 and flow meter 49 into pump 40. Densitometer 45 measures the density being drawn through pipe 37 and communicates the measured density through wire 46 to input 47 to process controller 48. A set point has been determined for the density and is fixed in process controller 48. If the slurry is too dense, in accordance with the set point, then a change to the signal applied at output 65 is made by controller 48. This signal is then communicated by wire 66 to the input of variable speed drive 55 which is connected through linkage 56 to pump 52 and will cause pump 52 to increase its rotational velocity above that it was previously set at. Additional fluids will then be drawn from sump 20 to pipe 53 and outputted through pipe 58 to dilution port 64, adding more water to the material being sucked through bell mouth 35. When the density as measured by densitometer 45, is proper, the signal communicated to input 47 to process controller 48, causes no change in the signal applied at output 65 of controller 48. This causes the rotational velocity of pump 52 to remain constant.

In case the density falls below the set point of controller 48, then the signal communicated through wire 66 to input 67 of variable speed drive 55 causes a reduction in the fluids being injected through dilution port 64 into pipe 37. It is obvious, of course, that rather than controlling the speed of rotation of pump 54, process controller 48 can transmit a signal through wire 69 to the control 70 of valve 60 causing the same result. Since there is a lag in time between a change in signal to valve 60 (or variable speed drive 55) and a change in measured density by densitometer 45, an improved response to a change in the signal from process controller 48 can be obtained by flow meter 79 which will send an immediate change in flow as a consequence of a change in the setting of valve 60. A sensed signal to flow meter 79 can then be used in the control process as an input to process controller 48 or another controller (not shown) thereby reducing the deviation in density in pipe 37. Both flow and density are necessary in a pipeline in order to maintain the velocity in a pipeline, that is, the velocity at which the particles will be suspended and not settle out during transmission through pipe 41 and hoist 42 to pipe 43 to the subsequent end use. Too little flow will cause the particles to settle out even if the density is proper. Such a flow can be measured by flow meter 49 communicated through wire 50 to input 51 of process controller 48.

Flow is measured by flow meter 49 which can be a magnetic flow meter. The output signal from flow meter 49 is communicated through wire 50 to process controller 48 when the measured flow is compared to a set point or predetermined flow. An error signal (if any) is used to generate a change in output 97 where it is communicated through wire 98 to a variable speed drive 99. Drive 99 is coupled through a mechanical means 100 to the shaft of pump 40 such that when the flow is too low as determined by apparatus 49, the pump impeller has its rotational speed increased by variable speed drive 99.

It is obvious that fluids entering through pipes 21 and 30, along with the fluidizing jets 72, 87 and 80, all tend to contribute fluid to the inside of tank 10. Thus some overflow must be provided. In the embodiment disclosed, overflow is provided by a circular external enlarged portion 13 which has a higher top 15 than the tank top 14. Thus overflow will flow over top 14 and into the reservoir formed between enlarged portion 13 and side wall 11. The flow is then connected through overflow bell mouth shaped pipe 17 and pipe 19 to sump 20. This provides additional fluids to the sump as necessary to operate the various fluidizing jets. Thus the water is recirculated over the weir formed by the top 14 of tank 10 and through the piping to the sump. If necessary additional water can be added from a source 95 through pipe 96 to sump 20. Sump 20 must be provided with some means for removing the accumulated particulate material that passes over the top 14 of tank 10. As determined by an actually constructed prototype, the amount of particulate material passing over the top 14 is directly proportional to the flow rate of the fluids passing over the top 14.

Excess particulate material accumulating in sump 20 can be removed by any state of the art means. The amount requiring removal, however, will generally only be a small percentage of the total amount handled by the reclaim apparatus disclosed herein.

In an embodiment in accordance with this invention, a vertical tank 18 feet in diameter and 38 feet high was constructed. The bottom of the silo was equipped with one $\frac{3}{8}''$ inside bell mouth fluidizing jet (No. 80), four $\frac{1}{2}''$ outside bell mouth fluidizing jets (No. 72), eight $\frac{3}{4}''$ bottom fluidizing jets (No. 87) equally spaced around the perimeter of the tank and one 10" dilution port or stream (No. 64). The inlet apparatus 22 was approximately 7 feet high and 8 feet in diameter. The object of the inlet apparatus was to reduce the amount of turbulence caused by the slurry inputting into the tank thus reducing the amount of fines passing over the top 14 of tank 10 and into the sump 20.

During the test for operation of tank 10 at low levels of solids or coal, it was determined that, when jets 87 were turned on, a resulting increase in the reclamation slurry density was obtained. This would definitely indicate that the fluidizing jets are moving otherwise settled coal toward the bell mouth 35 of the reclamation pump 40. During the majority of tests, densities of 1.20 to 1.25 gm/cm$^3$ were achieved in Canadian Cardinal River Coal. Such densities were not a function of the height of the coal slurry in tank 10 if sufficient coal is present in the tank to maintain proper density otherwise established the operational features of pump 52 and its dilution fluid port 64.

Figure 2:
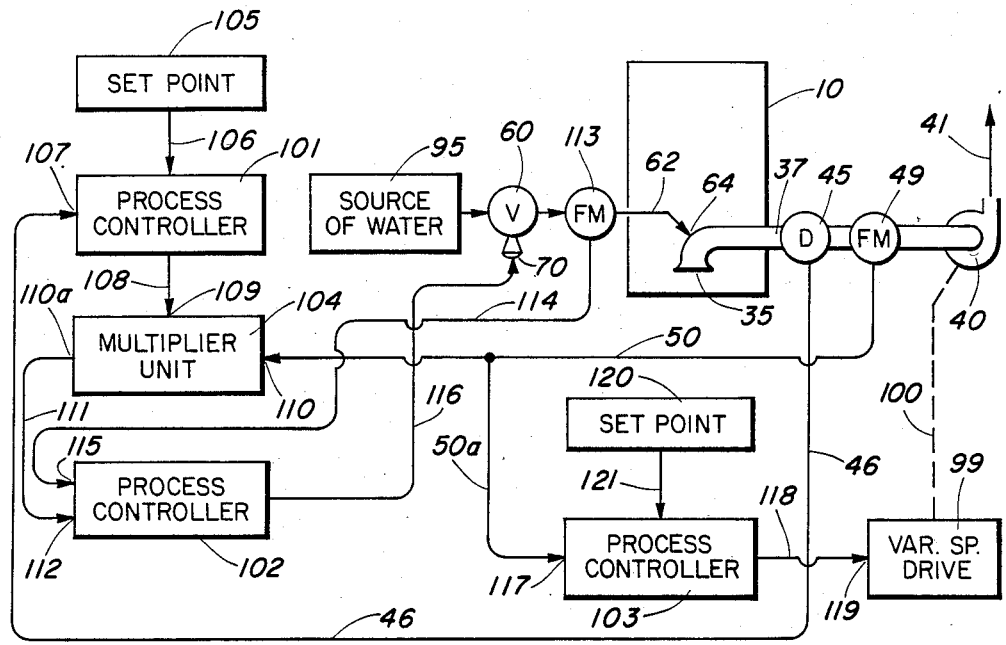
FIG. 2 is a schematic diagram of one form of control system for the apparatus illustrated in FIG. 1.

Referring to FIG. 2, three process controllers are used: process controller 101, process controller 102, and process controller 103. In addition to the process controllers, a multiplier unit 104 is used. A set point 105 inputs its signal through wire 106 to process controller 101. A densitometer 45 measuring slurry density has its output coupled through wire 46 to the input 107 of process controller 101. Flow meter 49 measuring slurry flow rate has its output coupled through wire 50 to an input 110 of multiplier unit 104. Output from process controller 101 is through a wire 108 to the input 109 of multiplier unit 104. The output 110a of multiplier unit 104 is coupled through a wire 111 to the input 112 of process controller 102. A flow meter 113 measuring dilution flow rate has its output coupled through a wire 114 to the input 115 of process controller 102. Process controller 102 has its output coupled through a wire 116 to the input 70 of control valve 60. Flow meter 49 is also coupled through wire 50 and wire 50a to an input 117 of process controller 103. Variable speed drive 99 gets its signal from process controller 103 via wire 118 to the input 119 of variable speed drive 99. Process controller 103 has a set point 120 coupled through a wire or other circuit means 121 to process controller 103.

OPERATION

This circuit illustrates the use of three process controllers and a multiplier unit for controlling the proper density and flow through pipe 37 to pump 40. As in the previous apparatus, the density is measured by densitometer 45 and the flow by flow meter 49. It is important that the overall density of this system be controlled; however, it is also important that the system have some previous knowledge as to change in flow and to accommodate this change as quickly as possible. Thus when flow meter 49 detects a drop in flow it will signal this change in flow to wire 50 and 50a. Process controller 103 will detect a need for a change in flow as determined by its set point 120. For example, if flow as sensed by flow meter 49 drops below a predetermined amount as indicated from a deviation from set point 120, then a change in a signal of wire 118 will be communicated to input 119 of variable speed drive 99. This change will cause a corresponding change in the operation of variable speed drive 99 which will be communicated through linkage 100 to pump 40. If the flow is decreasing then pump 40 will be increased in its rotational speed causing an increase in flow. When reduced flow occurs, however, for a brief period of time, the fluid being sucked into bell mouth 35 will cause a reduction in density as being measured by densitometer 45; therefore, the flow reduction is also communicated through wire 50 to the input of multiplier unit 104.

The measured density from densitometer 45 is inputted through wire 46 to the input 107 of process controller 101. Any deviation in density either less or more than that predetermined by set point 105 as communicated through 106 is outputted on wire 108 to input 109 to multiplier unit 104. Flow meter 49, as previously stated also communicates its output through wire 50 to input 110 of multiplier unit 104. Multiplier unit 104 then takes the product of the density signal being received from input 109 and the flow meter signal being inputted through input 110 and determines the product along with a constant determined by the system and outputs this signal through wire 111 to the input 112 of process controller 102. This product signal will then be applied to the control 70 of valve 60. Basically, the multiplier unit 104 and process controller 102 give the valve 60 immediate information as to the amount of fluids that should be inputted at port 64 in order to properly compensate for changes in flow and density from flow meter 49. For example, if the flow doubles, then the fluid being injected into port 64 should double. Thus the flow change being introduced into multiplier 104 will cause an immediate doubling to the signal being applied to the process controller 102 which will then be communicated through wire 116 to the control 70 of valve 60.

Any needed flow changes are determined primarily by the size of the line and the necessary operational requirements for the line. Thus as pump 40 sucks up material through bell mouth 35, it must maintain sufficient flow rate to keep the particles from settling out. Flow rates can change depending upon the material being sucked up as to quantity and nature; that is, if the material being sucked into the bell mouth is coal only, the density will have one value. If it is a combination of coal and slate or rock, it will have another value. Even though the combination of material being drawn into pipe 37 has the proper density as measured by density measuring apparatus 45, the combination of materials making up that density may cause a change in flow as measured by flow meter 49. This change in flow, as previously discussed, it will correct these errors rapidly such that the changes may be compensated at the output of variable speed drive 99 by the input through valve 60. Flow meter 113 will have its output communicated to wire 114 or input 115 of process controller 102. Flow meter 113 basically determines that the flow desired or needed has been achieved. The signal at input 115 will then be compared with the signal at 112 in order to determine the proper setting for valve 60. It is obvious that any one or all of the process controllers and the multiplier unit can be combined into a single computer or computers at the convenience of the user.

Figure 3:
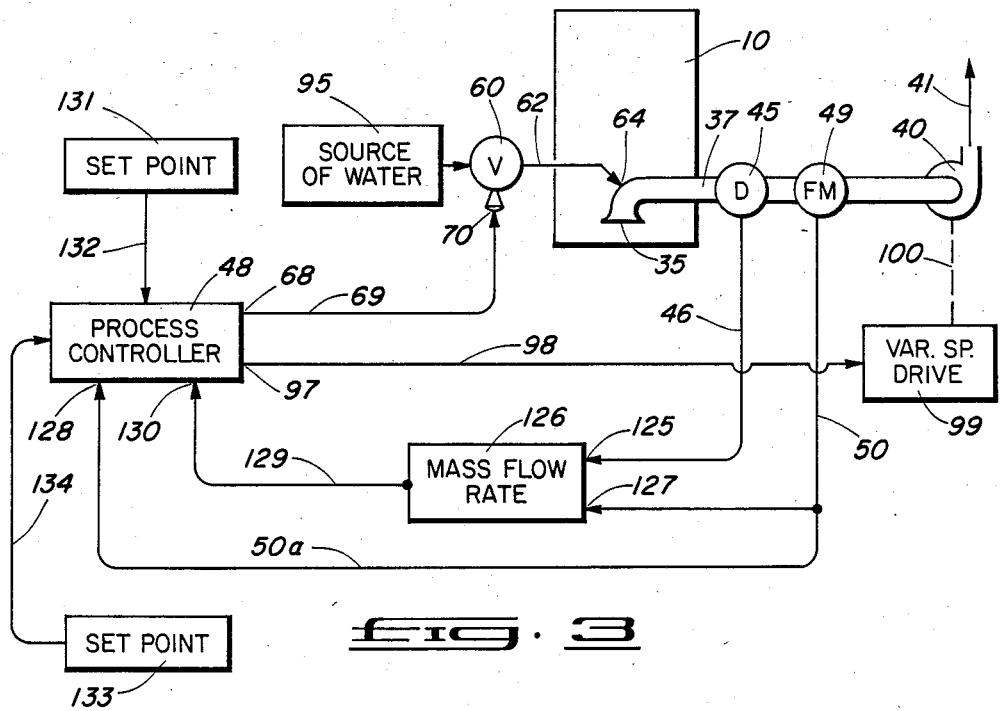
FIG. 3 is a second schematic for the apparatus illustrated in FIG. 1.

It is possible that the user will want to control on mass flow rate, rather than slurry density. FIG. 3 is a modified schematic which will control on mass flow rate. A signal from flow meter 49 is inputted through wire 50 and 50a to input 128 on the multiple process controller 48. Set point apparatus 133 is set at a predetermined value which has its output coupled either through a wire or through a circuit 134 to process controller 48. If the signal from flow meter 49 which is inputted through wire 50 and 50a into process controller 48, is below the predetermined value determined by set point 133, then the process controller 48 will signal through wire 98 to variable speed drive 99 to increase the impeller rotation in pump 40 through mechanical linkage 100. Conversely, if the signal from flow meter 49 which is inputted through wire 50 and 50a into process controller 48 is above that predetermined value determined by set point 133, then the process controller 48 will signal through wire 98 to variable speed drive 99 to decrease the impeller rotation on pump 40 through mechanical linkage 100.

Referring to FIG. 3, a second control loop inputs the signals from densitometer 45 through wire 46 into input 125 and from flow meter 49 through wire 50 into input 127 of a mass flow rate calculator unit 126. The output of the mass flow rate calculator unit 126 transmits its signal through line 129 into input 130 of the multiple process controller 48. This signal is compared with the value as set by set point apparatus 131 which has its output coupled either through a wire or through circuit 132 to process controller 48. If the signal from mass flow rate calculator unit 126 is below that predetermined set point 131, then the process controller 48 will output a signal through wire 69 to control valve 60 to let less dilution water through line 62, which will increase the mass flow rate. Conversely, if the signal from mass flow rate calculator unit 126 is above that predetermined set point 131, then the process controller will output a signal through wire 69 to control valve 60 to let more dilution water through line 62, which will decrease the mass flow rate.

In this double control loop it is possible that a change in the signal from flow meter 49 will also effect the value of the mass flow rate calculator 126. A decrease in the signal from flow meter 49 will result in a corresponding decrease in the signal from mass flow rate calculator unit 126. This can in turn drop the mass flow rate calculator signal below that of the predetermined set point 131. Then the process controller 48 will output a signal through wire 69 to control valve 60 to let less dilution water through line 62, which will increase the mass flow rate. Conversely, an increase in the signal from flow meter 49 will result in a corresponding increase in the signal from mass flow rate calculator unit 126. This can in turn raise the mass flow rate calculator signal above that of the predetermined set point 131. Then the process controller 48 will output a signal through wire 69 to control valve 60 to let more dilution water through line 62, which will decrease the mass flow rate.

In conclusion apparatus is disclosed which provides for an easily constructed vertical tank capable of handling large amounts of slurry and storing the slurry and removing it at a constant density and controlled flow. The apparatus is substantially easier to construct, particularly in an adverse environment as is in a mine, has few mechanical parts which require replacement due to wear, has no parts which move except pumps and variable speed drive and thus is more economical to construct, easier to maintain and more reliable in its use.

It is obvious that changes can be made in the application and still be within the spirit and scope of the invention as disclosed in the specification and appended claims.

What is claimed is:

1. An apparatus for storing a slurry and for controlling the density of said stored slurry during reclaim comprising:
   a. a confining means having at least a side wall and a bottom;
   b. means for adding a slurry containing solids and fluid into said confining means;
   c. overflow means communicating with said confining means for removing excess fluids;
   d. reclaim means including a mouth means facing in a substantially downwardly direction and spaced from said bottom;
   e. slurry pump means having an inlet and an outlet;
   f. pipe means coupling said slurry pump means inlet through said side wall, and to said mouth means, whereby material in the proximity of said mouth means can be drawn into said mouth means and removed by said slurry pump means;
   g. dilution port means mounted in said pipe means between said mouth means and said side wall means to reduce the density of said slurry in a controlled manner;
   h. a density measuring means mounted on said pipe means;
   i. a process control means having an input and an output with means connecting said input to said density measuring means for measuring the density of slurry in said pipe means and developing a signal at said output corresponding to said density;
   j. a source of fluid;
   k. a second pump means having an inlet coupled to said source of fluid and an outlet coupled to said dilution port means;
   l. dilution control means accepting said signal from said process control means and controlling the fluid passing from said source of fluid through said pump means to said dilution port means, and
   m. fluidizing jet means mounted through said side wall and at said bottom, said jet means connected to a source of fluid in a manner to force said slurry along said bottom toward said mouth means thereby maintaining said slurry at said bottom of said confining means in a fluid state so that said slurry will freely flow toward said mouth means;
   whereby an increase in measured slurry density will increase the volume of fluid being added into said pipe means coupling said mouth to said slurry pump means, and a decrease in measured density will cause a decrease in fluids being added into said pipe means.

2. Apparatus as described in claim 1 wherein said means for controlling the fluid passing from said source of fluid to said dilution port means comprises a valve having a control means, interposed between said second pump and said dilution port means and wherein said control means for said valve is operated by said output signal from said process control means.

3. Apparatus as described in claim 1 wherein said means for controlling the fluid passing from said source of fluid to said dilution port means comprises a variable speed drive coupled to said second pump means in a manner to control the rotational speed of said pump in accordance with said output signal from said process control means.

4. Apparatus as described in claims 1, 2, or 3 including fluidizing jets mounted around said mouth means and directed toward said bottom, a third pump means, and means coupling said third pump means to said fluidizing jets.

5. Apparatus as described in claim 1, 2, or 3 including flow sensing means mounted on said pipe means and having an output coupled to an input of said process control means.

6. Apparatus as described in claim 1, 2, or 3 wherein said mouth means is bell shaped.

7. Apparatus as described in claim 1, 2, or 3 wherein a fluidizing jet means is directed into said mouth means.

8. Apparatus as described in claim 1 wherein said means connecting said density measuring means to said process control means comprises a mass flow computing means having density and flow signal inputs and an output, said density input coupled to said density measuring means and said output coupled to said process controller input means, flow sensing means mounted in said pipe means, having a signal output with means coupling said signal output to said flow signal input and to a second input of said process control means, whereby said flow can be controlled between minimum and maximum rates while said dilution port means maintains the density as measured by said density measuring means at a value determined by the mass flow rate signal from said mass flow computing means.

9. Apparatus as described in claim 8 including a variable speed drive having a signal input coupled to a second output of said process control means and an output mechanically coupled to said slurry pump means.

10. Apparatus as described in claim 1 including a first flow sensing means mounted in said pipe means, and wherein said means connecting said process control means to said density measuring means includes a second process control means having an input connected to said density measuring means and an output connected to a first input of a multiplier means, means coupling the output from said first flow sensing means to a second input of said multiplier means, and means coupling the output product means of said multiplying means to said input of said process control means, whereby any change in flow as sensed by said first flow sensing means will cause a simultaneous and like change in the flow of fluids from said source of water to said dilution port means.

11. Apparatus as described in claim 10 including a second flow sensing means measuring said flow from said source of fluid to said dilution port means, having its output signal coupled to a second input of said process controller whereby said second flow sensing means signal provides feedback to said process controller, information as to the actual flow from said source of water to said dilution port means.

12. Apparatus as described in claim 10 or 11 including a third process control means having an input coupled to the output of said first flow sensing means and an output, a variable speed drive means coupled to control said slurry pump means, and means coupling said output of said third process control means to said variable speed drive and set point means for said third process control means whereby said flow through said pipe means is controlled by said third process control means.

* * * * *